US008187092B2

(12) United States Patent
Dixon

(10) Patent No.: US 8,187,092 B2

(45) Date of Patent: May 29, 2012

(54) WAGERING GAME WITH MULTIPLE VIEWPOINT DISPLAY FEATURE

(76) Inventor: Donald F. Dixon, Chicago, IL (US)

( * ) Notice: Subject to any disclaimer, the term of this patent is extended or adjusted under 35 U.S.C. 154(b) by 701 days.

(21) Appl. No.: 12/304,403

(22) PCT Filed: Jun. 13, 2007

(86) PCT No.: PCT/US2007/013893

§ 371 (c)(1), (2), (4) Date: Dec. 11, 2008

(87) PCT Pub. No.: WO2007/146347

PCT Pub. Date: Dec. 21, 2007

(65) Prior Publication Data

US 2009/0191965 A1 Jul. 30, 2009

Related U.S. Application Data

(60) Provisional application No. 60/814,098, filed on Jun. 14, 2006.

(51) Int. Cl.
*A63F 13/00* (2006.01)

(52) U.S. Cl. ................ 463/32; 463/30; 463/31; 463/33; 463/34

(58) Field of Classification Search .............. 463/16–25, 463/30–34

See application file for complete search history.

(56) References Cited

U.S. PATENT DOCUMENTS 4,517,558 A 5/1985 Davids
4,621,814 A 11/1986 Stepan et al.
4,672,541 A * 6/1987 Bromley et al. .................. 463/3
5,342,047 A 8/1994 Heidel et al.
5,449,173 A 9/1995 Thomas et al.
5,560,603 A 10/1996 Seelig et al.
5,638,523 A 6/1997 Mullet et al.
D392,340 S 3/1998 DeSimone
5,766,074 A 6/1998 Cannon et al.
5,772,509 A 6/1998 Weiss
5,807,172 A 9/1998 Piechowiak
5,911,418 A 6/1999 Adams (Continued)

FOREIGN PATENT DOCUMENTS

EP 0874337 A1 10/1998

(Continued)

OTHER PUBLICATIONS

Written Opinion corresponding to co-pending International Patent Application No. PCT/US2007/13893, United States Patent Office, dated Aug. 22, 2008, 3 pages.

(Continued)

*Primary Examiner* — Minh-Loan T Tran
*Assistant Examiner* — William Harriston
(74) *Attorney, Agent, or Firm* — Nixon Peabody LLP

(57) ABSTRACT

A gaming system for conducting a wagering game includes an input device for receiving a wager to play a wagering game. The gaming system further includes at least one display for displaying a plurality of game elements. The at least one display is adapted to display a first three-dimensional view of the plurality of game elements from a first viewpoint and a second three-dimensional view of at least one of the plurality of game elements indicating a randomly-selected outcome from a second viewpoint. The first three-dimensional view and the second three-dimensional view are rendered in real-time.

17 Claims, 11 Drawing Sheets

U.S. PATENT DOCUMENTS

| | | | | |
|---|---|---|---|---|
| 5,976,016 | A | 11/1999 | Moody et al. | |
| 6,045,447 | A * | 4/2000 | Yoshizawa et al. | 463/31 |
| 6,089,978 | A | 7/2000 | Adams | |
| 6,126,165 | A | 10/2000 | Sakamoto | |
| 6,135,884 | A | 10/2000 | Hedrick et al. | |
| 6,155,926 | A * | 12/2000 | Miyamoto et al. | 463/32 |
| 6,176,781 | B1 | 1/2001 | Walker et al. | |
| 6,241,609 | B1 * | 6/2001 | Rutgers | 463/31 |
| 6,254,481 | B1 | 7/2001 | Jaffe | |
| 6,267,669 | B1 | 7/2001 | Luciano, Jr. et al. | |
| 6,270,411 | B1 * | 8/2001 | Gura et al. | 463/20 |
| 6,280,323 | B1 * | 8/2001 | Yamazaki et al. | 463/4 |
| 6,287,197 | B1 | 9/2001 | Dickinson et al. | |
| 6,312,334 | B1 * | 11/2001 | Yoseloff | 463/25 |
| 6,315,660 | B1 * | 11/2001 | DeMar et al. | 463/16 |
| 6,368,216 | B1 * | 4/2002 | Hedrick et al. | 463/20 |
| 6,431,982 | B2 * | 8/2002 | Kobayashi | 463/4 |
| 6,454,649 | B1 * | 9/2002 | Mattice et al. | 463/17 |
| 6,476,812 | B1 * | 11/2002 | Yoshigahara et al. | 345/427 |
| 6,533,273 | B2 * | 3/2003 | Cole et al. | 273/138.1 |
| 6,602,139 | B2 * | 8/2003 | Yamaguchi | 463/30 |
| 6,634,947 | B1 * | 10/2003 | Miyamoto et al. | 463/36 |
| 6,666,766 | B2 | 12/2003 | Baerlocher et al. | |
| 6,780,105 | B1 | 8/2004 | Kaminkow | |
| 6,811,482 | B2 | 11/2004 | Letovsky | |
| 6,843,723 | B2 | 1/2005 | Joshi | |
| 6,866,585 | B2 | 3/2005 | Muir | |
| 6,887,157 | B2 | 5/2005 | LeMay et al. | |
| 7,112,133 | B2 | 9/2006 | Lyons | |
| 7,128,647 | B2 | 10/2006 | Muir | |
| 7,195,560 | B2 * | 3/2007 | DeMar et al. | 463/20 |
| 7,311,607 | B2 | 12/2007 | Tedsen et al. | |
| 7,341,520 | B2 | 3/2008 | Mattice et al. | |
| 7,361,086 | B2 * | 4/2008 | Gazdic et al. | 463/16 |
| 7,364,506 | B2 * | 4/2008 | Jaffe et al. | 463/20 |
| 7,545,374 | B2 * | 6/2009 | Akada et al. | 345/427 |
| 7,618,319 | B2 * | 11/2009 | Casey et al. | 463/25 |
| 7,628,690 | B2 * | 12/2009 | Englman et al. | 463/17 |
| 7,789,756 | B2 * | 9/2010 | Jones et al. | 463/37 |
| 7,806,767 | B2 * | 10/2010 | Kitao | 463/31 |
| 7,874,909 | B2 * | 1/2011 | Pryzby et al. | 463/20 |
| 2002/0002078 | A1 * | 1/2002 | Jaffe | 463/30 |
| 2002/0065132 | A1 * | 5/2002 | Stephan | 463/30 |
| 2002/0151349 | A1 * | 10/2002 | Joshi | 463/20 |
| 2002/0151360 | A1 * | 10/2002 | Durham et al. | 463/30 |
| 2003/0032479 | A1 * | 2/2003 | LeMay et al. | 463/32 |
| 2003/0064800 | A1 * | 4/2003 | Jackson et al. | 463/30 |
| 2003/0069066 | A1 | 4/2003 | Seelig et al. | |
| 2004/0002380 | A1 | 1/2004 | Brosnan et al. | |
| 2004/0029636 | A1 | 2/2004 | Wells | |
| 2004/0053868 | A1 | 3/2004 | Aurelian et al. | |
| 2004/0077401 | A1 | 4/2004 | Schlottmann | |
| 2004/0077402 | A1 | 4/2004 | Schlottmann | |
| 2004/0077404 | A1 | 4/2004 | Schlottmann et al. | |
| 2004/0102244 | A1 * | 5/2004 | Kryuchkov et al. | 463/32 |
| 2004/0102245 | A1 | 5/2004 | Escalera et al. | |
| 2004/0121840 | A1 * | 6/2004 | Rosander et al. | 463/31 |
| 2004/0142746 | A1 * | 7/2004 | Hinami et al. | 463/32 |
| 2004/0192430 | A1 | 9/2004 | Burak et al. | |
| 2005/0037843 | A1 * | 2/2005 | Wells et al. | 463/30 |
| 2005/0059487 | A1 | 3/2005 | Wilder et al. | |
| 2005/0075167 | A1 * | 4/2005 | Beaulieu et al. | 463/32 |
| 2005/0153767 | A1 * | 7/2005 | Gauselmann | 463/16 |
| 2005/0215318 | A1 * | 9/2005 | Seelig et al. | 463/31 |
| 2005/0215319 | A1 | 9/2005 | Rigopulos et al. | |
| 2005/0255908 | A1 | 11/2005 | Wells | |
| 2005/0277468 | A1 * | 12/2005 | Fitzsimons et al. | 463/31 |
| 2006/0058100 | A1 * | 3/2006 | Pacey et al. | 463/31 |
| 2006/0068900 | A1 | 3/2006 | Englman | |
| 2006/0287058 | A1 * | 12/2006 | Resnick et al. | 463/19 |
| 2007/0060390 | A1 | 3/2007 | Wells | |
| 2008/0113745 | A1 | 5/2008 | Williams et al. | |
| 2008/0220863 | A1 | 9/2008 | Pacey | |
| 2010/0062830 | A1 * | 3/2010 | Hornik | 463/20 |

FOREIGN PATENT DOCUMENTS

| | | | |
|---|---|---|---|
| EP | 0945837 | A2 | 9/1999 |
| EP | 0984409 | A2 | 3/2000 |
| WO | WO 97/32285 | | 9/1997 |
| WO | WO 00/12186 | | 3/2000 |
| WO | WO 2005/016473 | A2 | 2/2005 |
| WO | WO 2006/039257 | A1 | 4/2006 |
| WO | WO 2006/039324 | A2 | 4/2006 |
| WO | WO 2006/039348 | A1 | 4/2006 |
| WO | WO 2006/039371 | A1 | 4/2006 |
| WO | WO 2007/021559 | A2 | 2/2007 |
| WO | WO 2007/021560 | A2 | 2/2007 |
| WO | WO 2007/032878 | A2 | 3/2007 |
| WO | WO 2007/136537 | A2 | 11/2007 |
| WO | WO 2007/146264 | A2 | 12/2007 |
| WO | WO 2008/060517 | A2 | 5/2008 |
| WO | WO 2008/063390 | A2 | 5/2008 |
| WO | WO 2008/097577 | A1 | 8/2008 |

OTHER PUBLICATIONS

International Search Report corresponding to co-pending International Patent Application No. PCT/US2007/13893, United States Patent Office, dated Aug. 22, 2008, 2 pages.

* cited by examiner

WAGERING GAME WITH MULTIPLE VIEWPOINT DISPLAY FEATURE

CROSS REFERENCE TO RELATED APPLICATIONS

This application is a U.S. national stage of International Application No. PCT/US2007/013893, filed Jun. 13, 2007, which is related to and claims priority to U.S. Provisional Application No. 60/814,098, filed Jun. 14, 2006, each of which is incorporated herein in its entirety.

FIELD OF THE INVENTION

The present invention relates generally to gaming machines, and methods for playing wagering games, and more particularly, to a wagering game having a multiple viewpoint display feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Many current wagering games include a display generally displaying a broad view of the game with numerous, small game elements (e.g., characters, graphics, or the like) of the game thereon. This type of view may be desirable to allow the player to view the entire gaming environment. For example, all of a plurality of player-selectable elements may be shown simultaneously to a player. One drawback, however, to displaying only a broad view of the game is that the individual game elements must be relatively small for all of the elements to fit on the display. Because of their small size, many game elements of current wagering games lack substantial detail. This lack of detail may cause the game elements to look "generic." Thus, the player's anticipation and excitement may be limited, thereby decreasing the ability of the wagering game to draw the player into the game.

Therefore, there is a need for a wagering game to provide other, more detailed views of the elements of the wagering game.

SUMMARY OF THE INVENTION

According to one aspect of the present invention, a gaming system for conducting a wagering game includes an input device for receiving a wager to play a wagering game. The gaming system further includes at least one display for displaying a plurality of game elements. The at least one display is adapted to display a first three-dimensional view of the plurality of game elements from a first viewpoint and a second three-dimensional view of at least one of the plurality of game elements indicating a randomly-selected outcome from a second viewpoint. The first three-dimensional view and the second three-dimensional view are rendered in real-time.

According to another aspect of the invention, a method of conducting a wagering game on a gaming system comprises displaying a first three-dimensional view of a plurality of game elements from a first viewpoint. The method further comprises displaying a second three-dimensional view of at least one of the plurality of game elements indicating a randomly selected outcome from a second viewpoint. The position of the at least one of the plurality of game elements is based on a randomly-selected outcome. The first three-dimensional view and the second three-dimensional view are simultaneously displayed in real-time.

According to yet another aspect of the invention, a computer readable storage medium is encoded with instructions for directing a gaming system to perform the above method.

According to yet another aspect of the invention, a gaming system comprises an input device for receiving a wager to play a wagering game. The gaming system further comprises at least one display for displaying a path including a plurality of stations. The at least one display is adapted to display a first three-dimensional view of the path from a first viewpoint and a second three-dimensional view of a randomly-selected station from a second viewpoint. The first three-dimensional view and the second three-dimensional view are simultaneously rendered in real-time.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
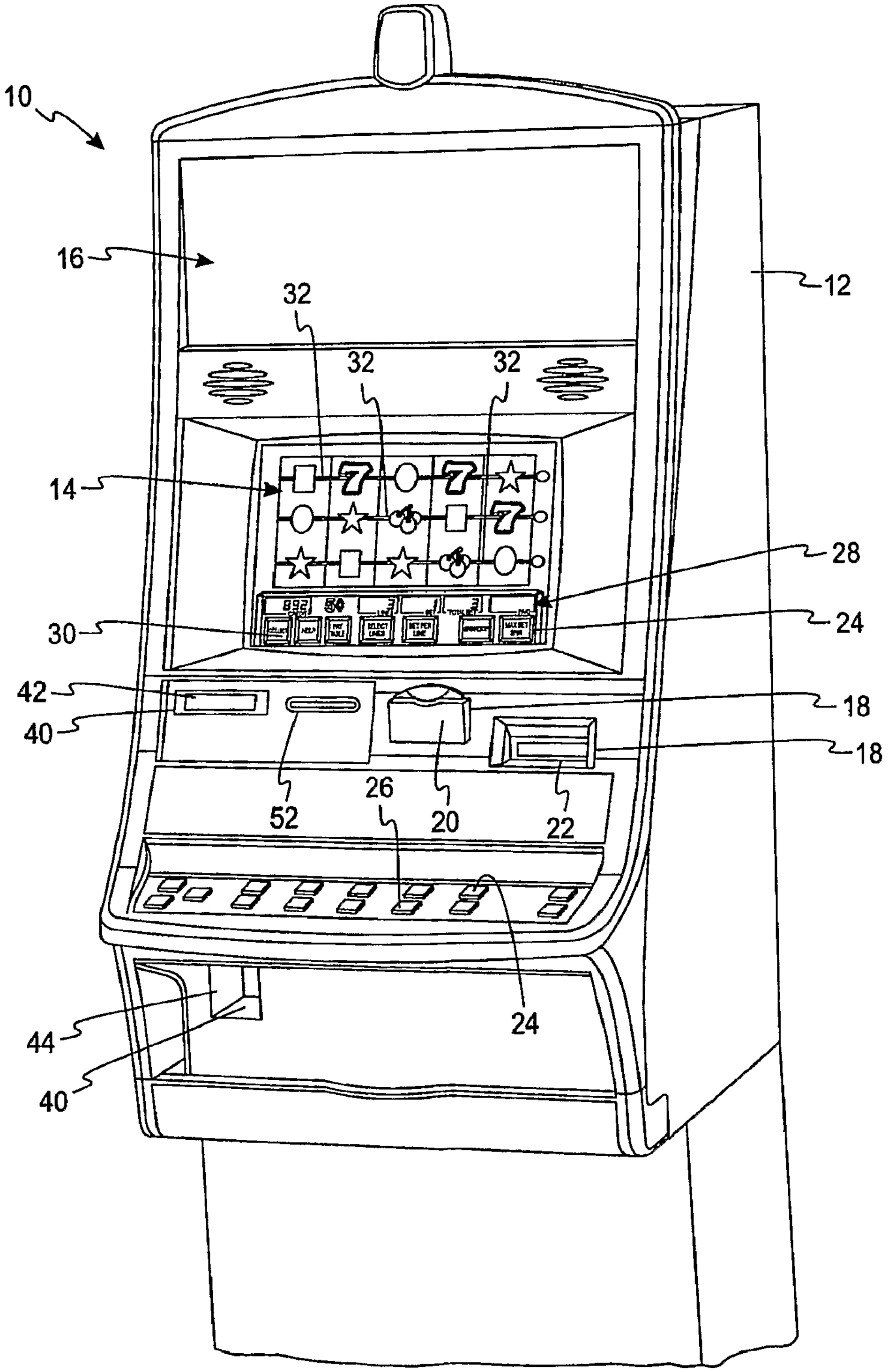
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
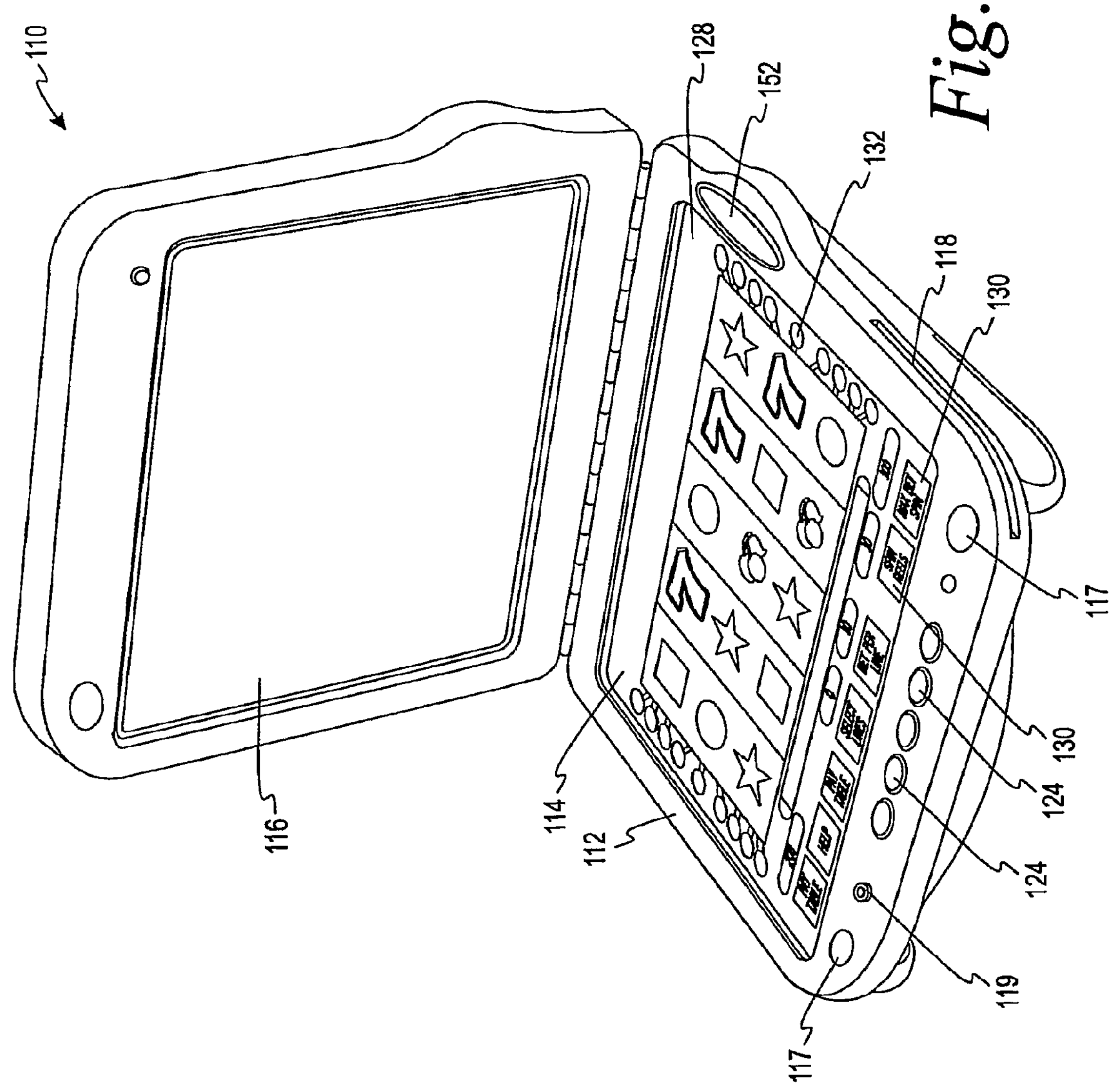
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
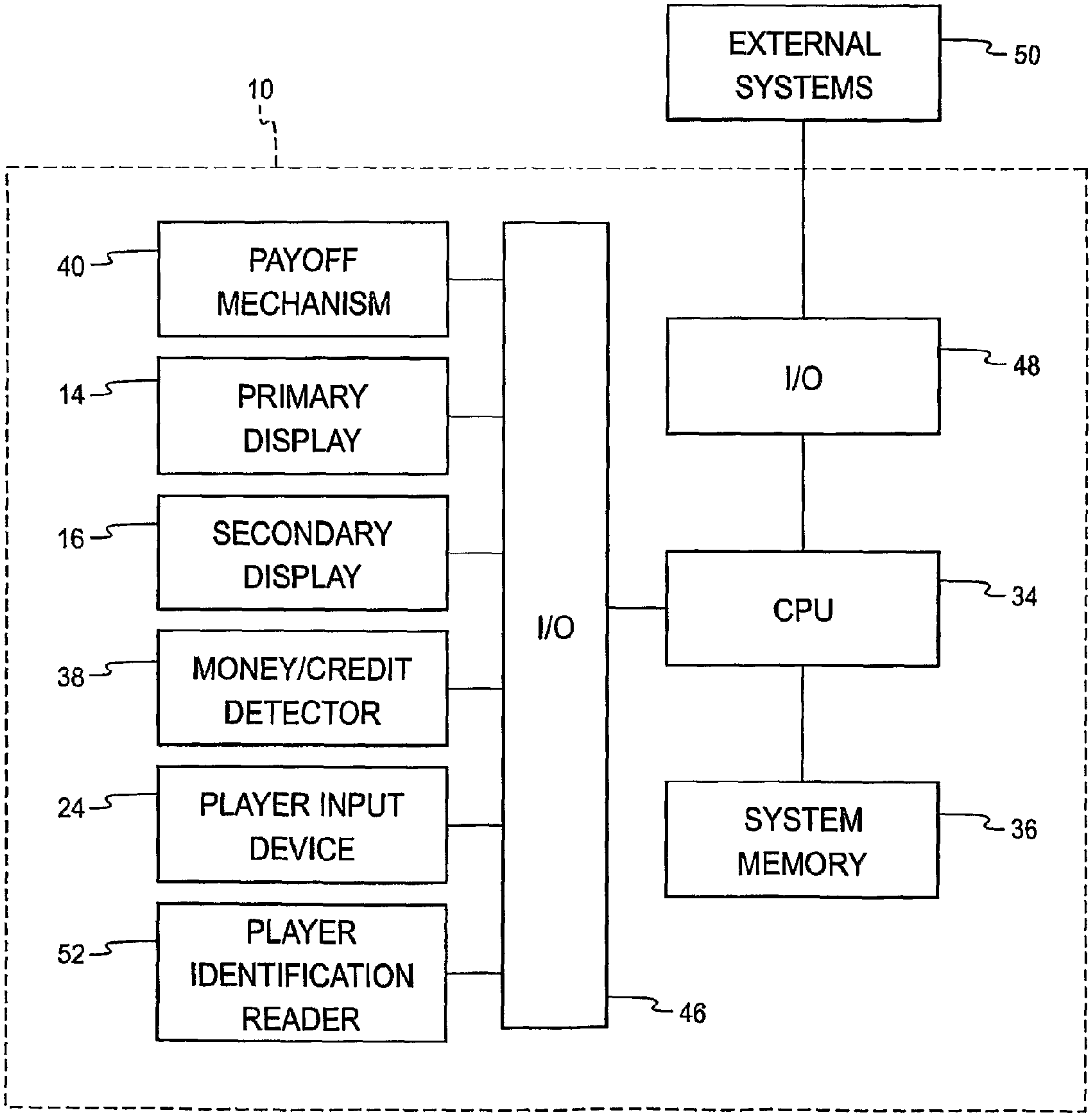
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
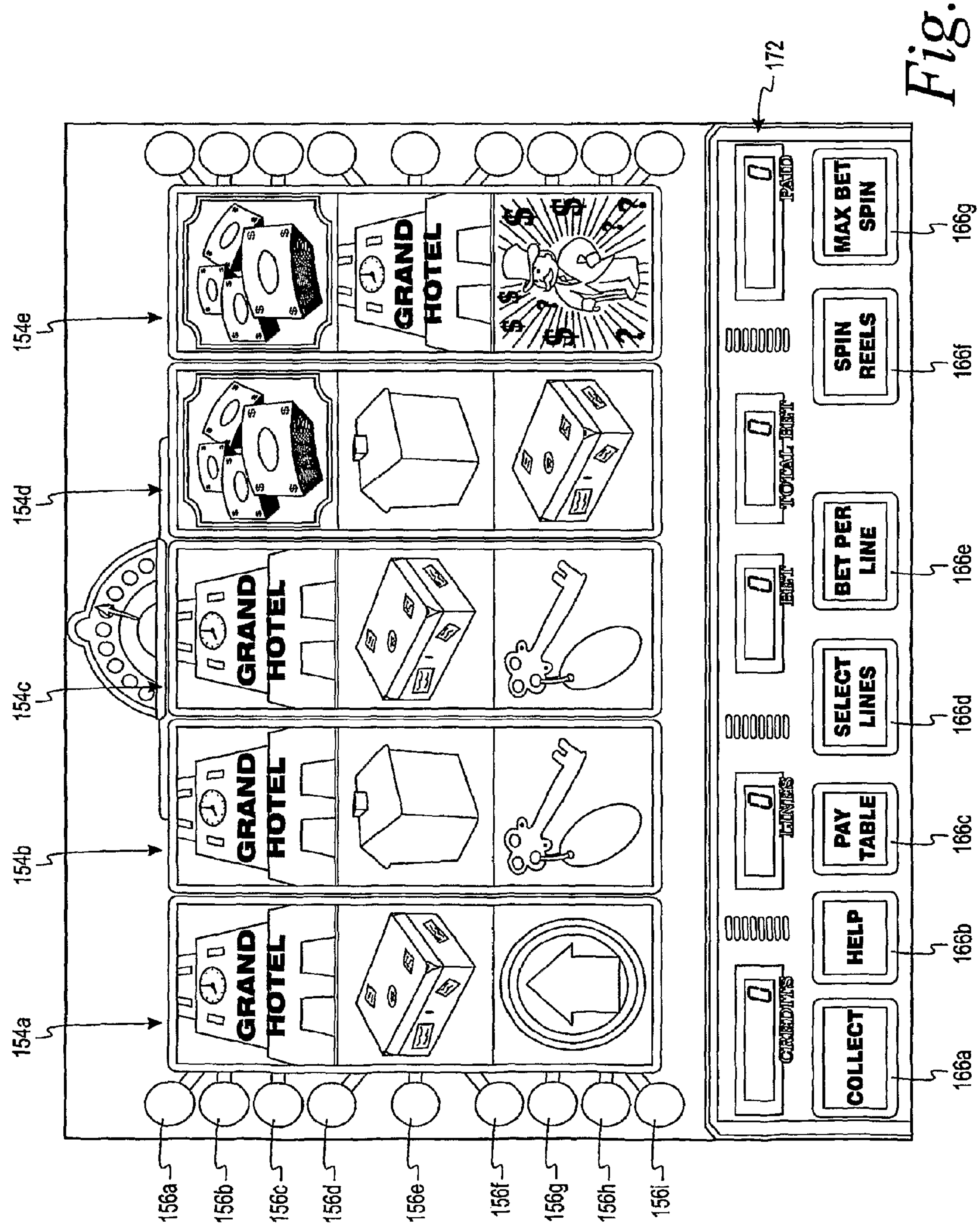
FIG. 3 is a display of an initial basic game screen according to one embodiment.

Turning now to FIG. 3, a basic game is implemented on the primary display 14. In this embodiment, the basic game is a slot machine game, with symbols on five different reels 154*a*, 154*b*, 154*c*, 154*d*, 154*e*. The reels 154*a-e* may be traditional mechanical reels, electromechanical reels, or computer-generated images of reels, with each reel having a plurality of symbols thereon. In the illustrated embodiment, there are multiple pay lines shown by the pay line indicators 156*a-i* across the various reels 154*a-e*. While multiple pay lines are shown, a gaming terminal 10 with a single pay line may also be used with the present invention. An outcome indicator 172 indicates whether the outcome has resulted in a payout, a progressive jackpot, a bonus game, or whether it resulted in no reward at all.

In the illustrated example, various combinations of symbols, either along active pay lines or in predefined cell locations, patterns, or quantities, may indicate prizes including monetary and non-monetary prizes. The non-monetary prizes include free spins, multipliers, entry into a bonus game, entry into a progressive game, or the like.

During the basic game of the illustrated embodiment of FIG. 3, the player places a wager on any number of pay lines, as denoted by the pay line indicators 156*a-i*. In the illustrated embodiment, the wager may be between one and five credits per pay line. However, in other embodiments, other wager amounts may be made. Once the player has placed the wager and activated a "spin reels" button 166*f*, the reels 154*a-e* begin to spin. As illustrated in FIG. 3, near the bottom of the display 14 are a plurality of keys 166*a-g* that enable the player to perform various functions, such as select the pay lines to play, select a wager amount, and spin the reels 154*a-e*. The result of the spin may be displayed on one or more outcome indicators 172 located above the keys 166*a-g*. For example, the outcome indicator 172 may provide the player with information such as the amount of the current wager, the amount awarded, the total number of credits remaining, and the like. Winning pay lines may be highlighted on the primary display 14.

In the illustrated example of FIG. 3, the player has made a wager, and the reels 154*a-e* have spun. In this embodiment, a pay line corresponding with the pay line indicator 156*c* traverses the top symbols of the reels 154*a-e*. At the conclusion of the reel spin depicted in FIG. 3, the pay line 154*c* includes three "grand hotel" symbols, creating a winning symbol combination. The player is awarded an initial basic game payout according to a basic game pay table, as shown on the outcome indicator 172. The pay table for the basic game indicates the possible winning combinations of symbols and the initial payout associated with each winning combination prior to any bonus events. For line pays (i.e., winning combinations that must appear on an active pay line), the payout is typically multiplied by the number of credits wagered on the winning pay line. For scatter pays (i.e., winning combinations that must appear on the display in a predetermined configuration but need not appear on an active pay line), the payout may be multiplied by the total number of credits wagered.

In many traditional gaming machines, the basic game concludes following the stopping of the reels, the evaluation of the winning combinations, and the payment of awards. Other gaming machines may award a bonus game during which the player may be awarded a bonus prize. A bonus game is triggered when a special "start bonus" outcome occurs in the basic game. The bonus game may be displayed on the primary display 14, the secondary display 16, or both. For example, in FIG. 3, a winning combination of three or more hotel-related symbols appearing on an active pay line 156*a-i* during the basic game triggers a bonus game.

Figure 4:
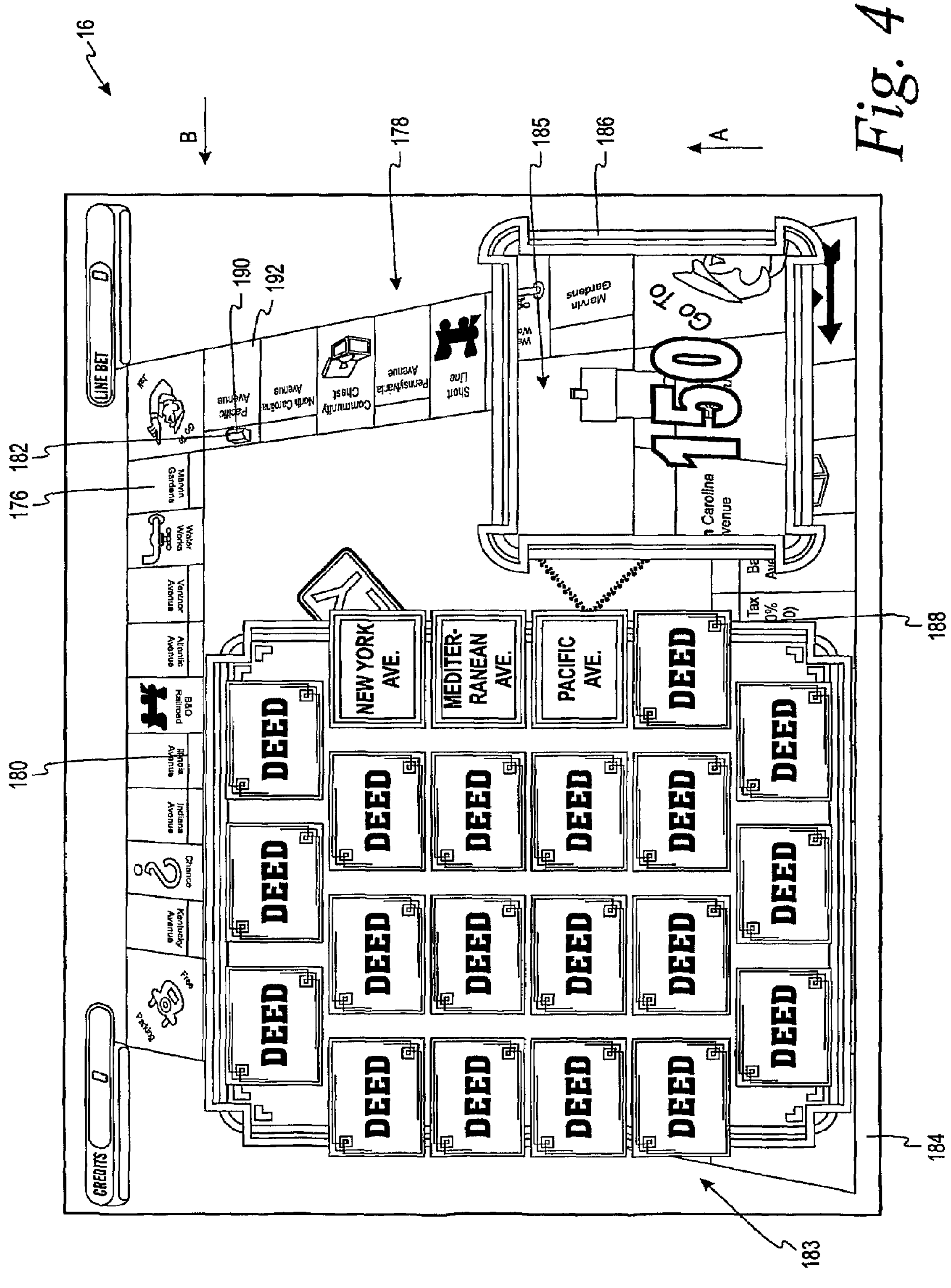
FIG. 4 is a display of a screen subsequent to the screen of FIG. 3 according to one embodiment of the present invention.

FIG. 4 illustrates a bonus game displayed on a secondary display 16 according to one embodiment of the present invention. The bonus game may also be displayed on the primary display 14. The bonus game of FIG. 4 has a board-game (i.e., MONOPOLY®) theme. The board-game defines a plurality of stations or squares 176 located on a game board 178. The stations 176 include properties, CHANCE, COMMUNITY CHEST, GO TO JAIL, and the like. In the embodiment of FIG. 4, a plurality of deeds 180 are displayed facedown in or near the center of the game board 178. The player may select one or more of the face-down deeds 180. As each deed 180 is selected, a hotel 182 appears on a property corresponding with the selected deed. After the player makes his or her final selection, the deeds 180 are removed from the display 16, revealing a plurality of animated hotel guests (e.g., guests 218 of FIG. 5) located in or near the center of the game board 178. Each guest then begins heading toward a randomly-selected station 176. The player may receive awards based on the stations 176 to which the guests run. For example, a large award may be awarded if a guest runs to a property having a hotel 182 built thereon.

According to the present invention, at least one display (e.g., primary display 14, secondary display 16) displays more than one view of a gaming environment. Referring to the embodiment of FIG. 4, for example, the display 16 includes a first view 183 displayed on a main screen 184 generally showing the entire game board 178 and the deeds 180. The display 16 further includes a second view 185 displayed in an inset window 186. In the illustrated embodiment, as the player selects a PACIFIC AVE. deed 188, which is displayed on the main screen 184, the inset window 186 shows a close-up, second view 185 of a hotel 190 being built on a PACIFIC AVENUE property 192.

Each of the first view 183 and the second view 185 shows a three-dimensional (3-D) view of the gaming environment designed or configured to present the theme (e.g., MONOPOLY board-game theme) of the wagering game. The theme is filmed in a 3-D gaming environment using at least one virtual camera that renders a sequence of two-dimensional (2-D) images or photographs derived from 3-D objects in the 3-D gaming environment. According to the embodiment of FIG. 4, for example, the display 16 shows a first sequence of images displayed in the main screen 184 and a second sequence of images displayed in the inset window 186. A 3-D position of each 3-D object in the 3-D gaming environment in the sequence of 2-D images is defined by a position of the virtual camera in the 3-D gaming environment. A sequence of positions of the virtual camera in the 3-D gaming environment used to film the theme may be preselected, or the sequence of positions of the virtual camera may be controlled by a player operating the wagering game. Alternatively, a physics engine may be implemented that realistically animates physical objects within the gaming environment.

The 3-D views of the gaming environment of the present invention are displayed in real-time on the display 16. In a real-time determination and display embodiment, game activity is shown on the display 16 at substantially the same time that the underlying mathematical basis for the displayed game activity is being calculated. Furthermore, according to the present invention, the game activities displayed in each of the first and second views 183, 185 are shown occurring simultaneously. For example, a sequence of photographs generated from a virtual camera in the gaming environment is displayed simultaneously with a second sequence of photographs generated from the virtual camera. More than one virtual camera may also be used. Thus, the player is actually shown different viewpoints of the events of the game as they are occurring. Such so-called "rendering on the fly" may allow a player to interact with a gaming machine 10 during the display of game activity to alter the game outcome. The different views 183, 185 may be displayed in a variety of configurations on the display 16, including next to one another, on top of one another, or in a "picture-in-picture" format as seen in FIG. 4.

The virtual camera may jump from different areas of the game board 178, such as between events of the wagering game. For example, when a player selects a next deed, the virtual camera may jump from the property associated with the previously selected deed (e.g., PACIFIC AVE. 192) to the property associated with the next selected deed. Alternatively, the transition between the different areas of the game board 178 may also appear to be smooth. For example, the virtual camera may pan from one property to the next in a continuous manner.

The 3-D, real-time views of the present invention display at least a portion of the game board 178 from different viewpoints. The viewpoints may be shown at different distances, virtual camera angles, combinations thereof, or the like. Referring back to FIG. 4, for example, the first view 183 shows a broad, distant view the game board 178 during which the virtual camera is generally aimed in the direction of Arrow A. The second view 185 shows a closer-up or zoomed-in view of an element of the game board 178—PACIFIC AVENUE 192—in which the virtual camera is generally aimed in the direction of Arrow B. Displaying elements of the wagering game from various distances and/or virtual camera angles allows a player to simultaneously maintain a broad view of the game as well as perceive more detail regarding the game activity. Thus, this feature allows for a more realistic, interactive view of the elements and thereby increases the anticipation and excitement experienced by the player.

According to another embodiment of the present invention, more than two views of a gaming environment may be displayed on a display 14, 16 of a gaming machine 10. The display 14, 16 may include, for example, a first view 183 (e.g., a full view) and a second view 185 as described above with respect to FIG. 4. The display may further include a third view of another one of the plurality of game elements, another perspective (e.g., virtual camera angle) of the first view or the second view, combinations thereof, or the like.

Figure 5:
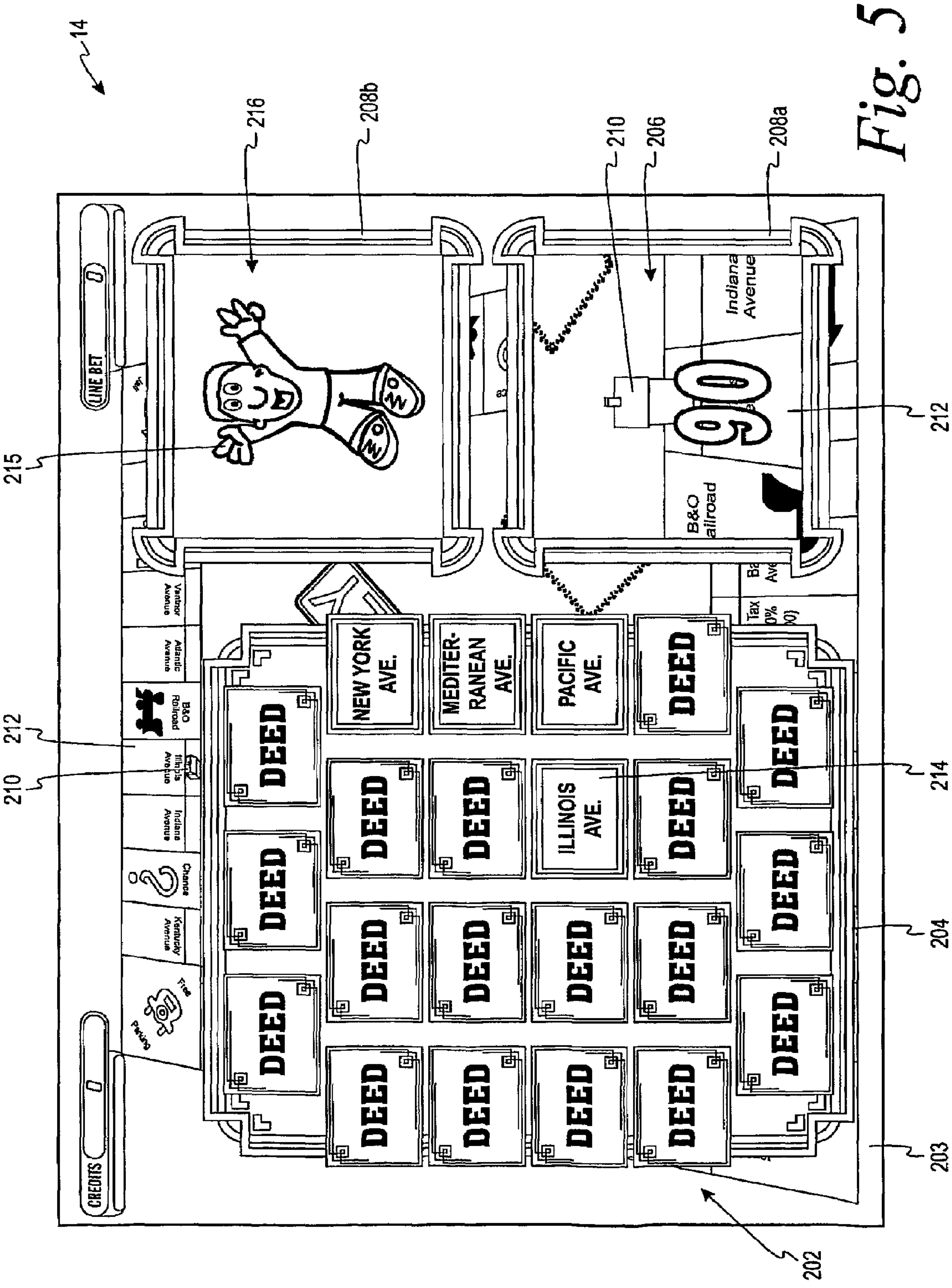
FIG. 5 is a display of a screen subsequent to the screen of FIG. 3 according to another embodiment of the present invention.

Referring to FIG. 5, for example, the primary display 14 includes three different views of a gaming environment similar to the gaming environment of FIG. 4. A first view 202 displayed on a main screen 203 shows one of a plurality of deed cards 204 being selected by a player. A second view 206 displayed in a first inset window 208*a* shows a hotel 210 being built on a property (i.e., ILLINOIS AVENUE) 212 corresponding with a selected deed card (i.e., ILLINOIS AVE.) 214. The embodiment of FIG. 5 further includes a third view 216 displayed in a second inset window 208*b*. As the hotel 210 is being built on the property 212, the third view 216 simultaneously shows a hotel guest 218 looking on and becoming more and more excited, thus adding excitement to the player's gaming experience. Other game elements and/or viewpoints may also be displayed in any of the first view 202, the second view 206, and/or the third view 216. A different number of views may also be shown on the display 14 (i.e., more than three).

Figure 6A:
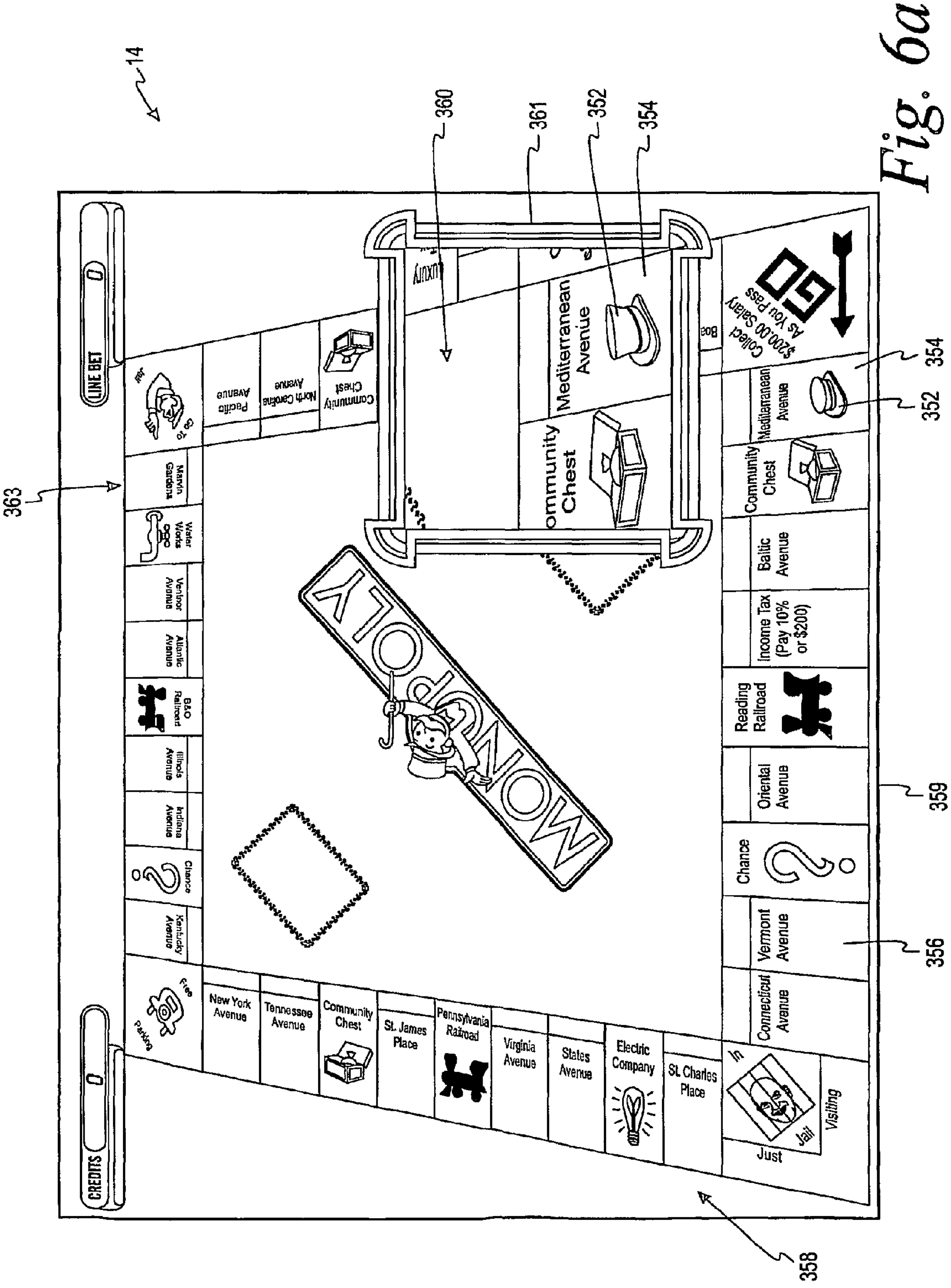
FIG. 6*a* is a display of a screen subsequent to the screen of FIG. 3 according to another embodiment of the present invention.

Referring now to FIGS. 6*a,b*, a bonus game having a MONOPOLY game theme is shown according to another embodiment of the present invention. In the embodiment of FIGS. 6*a,b*, a display 14 includes a game token 352, or token "identifier" indicating the position of a player on a game board 353. The token may include a MONOPOLY token (e.g., car, dog, horse, shoe, hat), an illuminated station of the game board, or the like. The token 352 then moves a number of stations 354 or steps from its starting position (e.g., the GO square 356). The amount of stations 354 moved may, for example, correspond to a sum of two virtual dice that may be "rolled" by pressing a corresponding key on the display 14. In one embodiment, when the token 352 stops moving, an animated character icon announces the name of the station 354 landed on by the token 352. The player may then be awarded, for example, the amount indicated on the station 354.

Figure 6B:
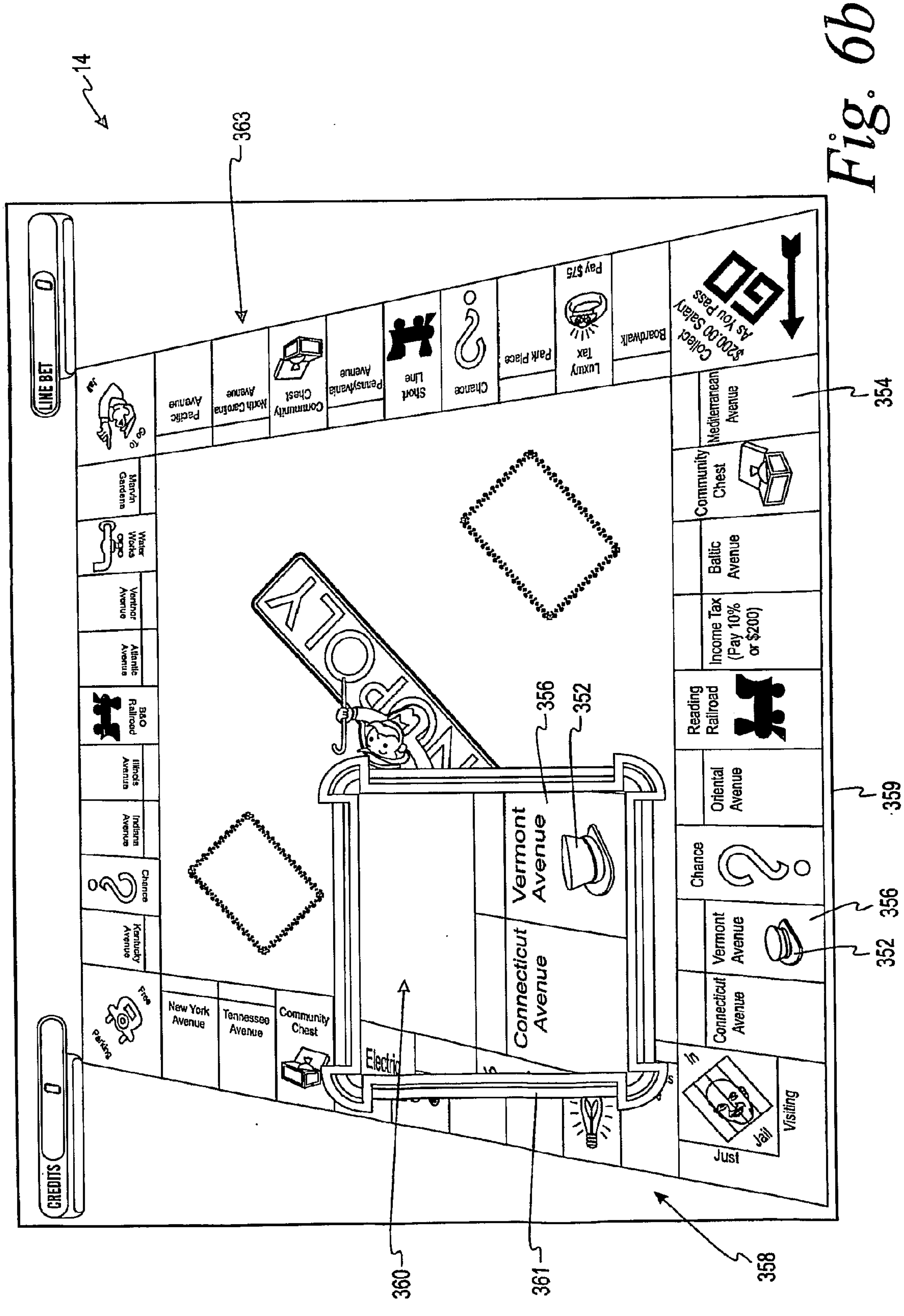
FIG. 6*b* is a display of a screen subsequent to the screen of FIG. 6*a;*

According to the embodiment of FIGS. 6*a,b*, the display 14 includes a first view 358 displayed on a main screen 359 and a second view 360 displayed in an inset window 361. The inset window 361 is associated with, or "pinned," to the token 352, thereby traveling with the token 352 as the token 352 advances along the stations 354 of a game board 363. FIG. 6*b* shows the token 352 of FIG. 6*a* after advancing from a first station 354 to a second station 356. The inset window 361 has, thus, physically moved to a different position on the display 14 along with the token 352. The second view 360 has also been modified in real-time to show a close-up view of the second station 356.

Figure 7A:
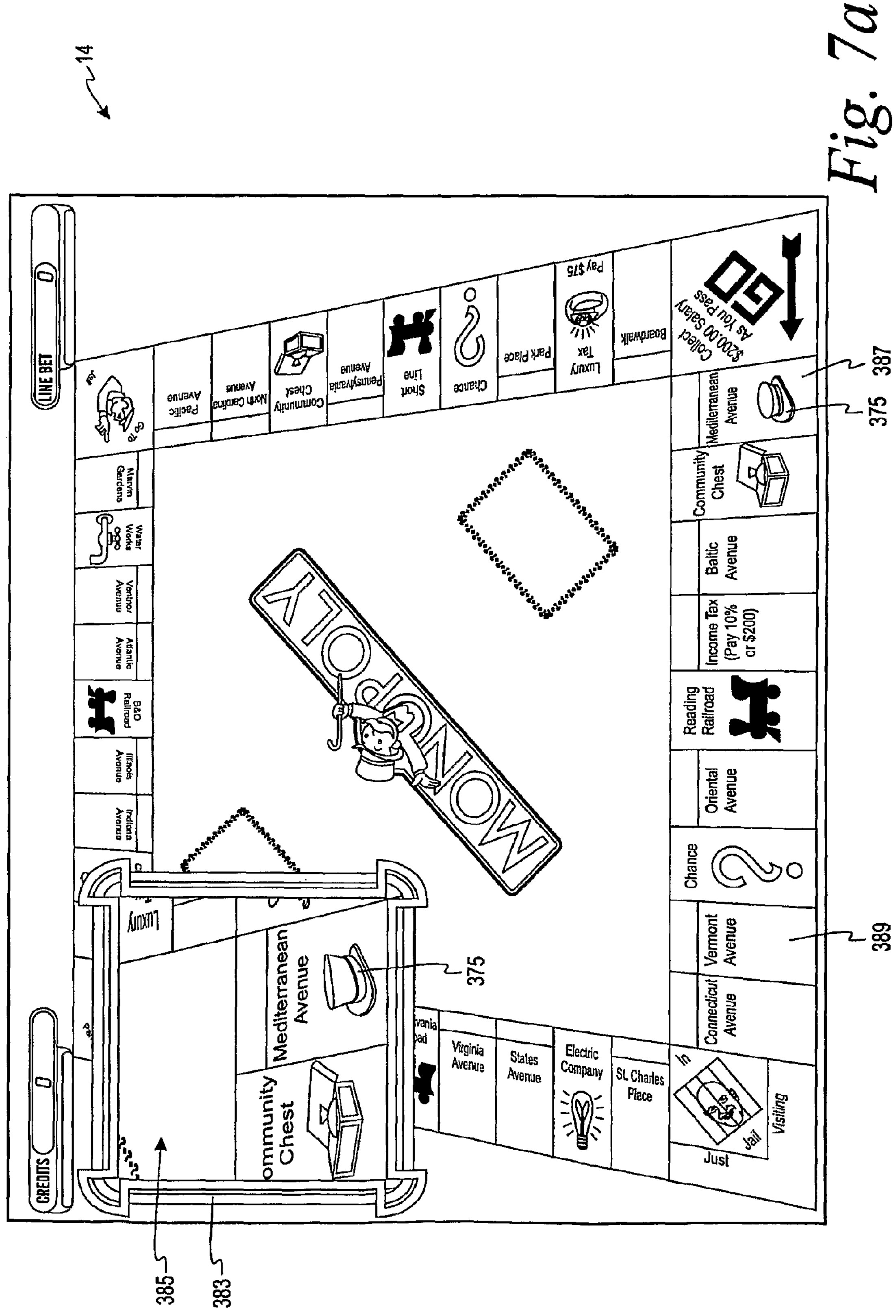
FIG. 7*a* is a display of a screen subsequent to the screen of FIG. 3 according to another embodiment of the present invention.
Figure 7B:
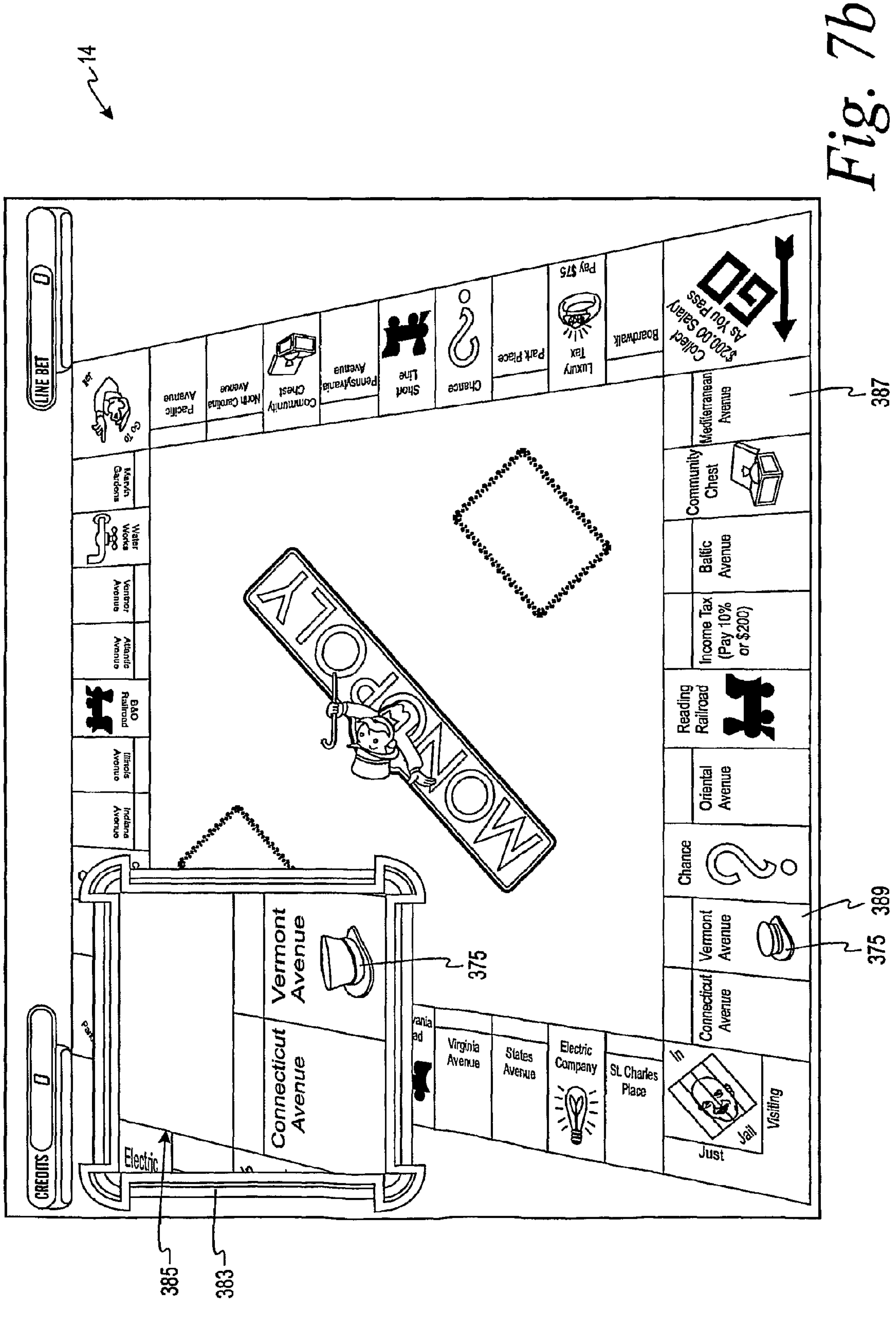
FIG. 7*b* is a display of a screen subsequent to the screen of FIG. 7*a*.

FIGS. 7*a,b* shows a gaming environment similar to that of FIGS. 6*a,b*. In the embodiment of FIGS. 7*a,b*, however, as a token 375 advances, an inset window 383 displaying a second view 385 of the gaming environment remains fixed in the same position relative to the display 14. Thus, only the second view 385 within the inset window 383 changes as the token 375 advances from a first station 387 of FIG. 7*a* to a second station 389 of FIG. 7*b*.

Although in the illustrated embodiments, the first view is shown as a full, broad view of the gaming environment, such a full, broad view is not required. For example, the views of the display 14, 16 may show an element of the gaming environment from two different viewpoints, game activities involving different game elements occurring simultaneously, combinations thereof, or the like.

Figure 8:
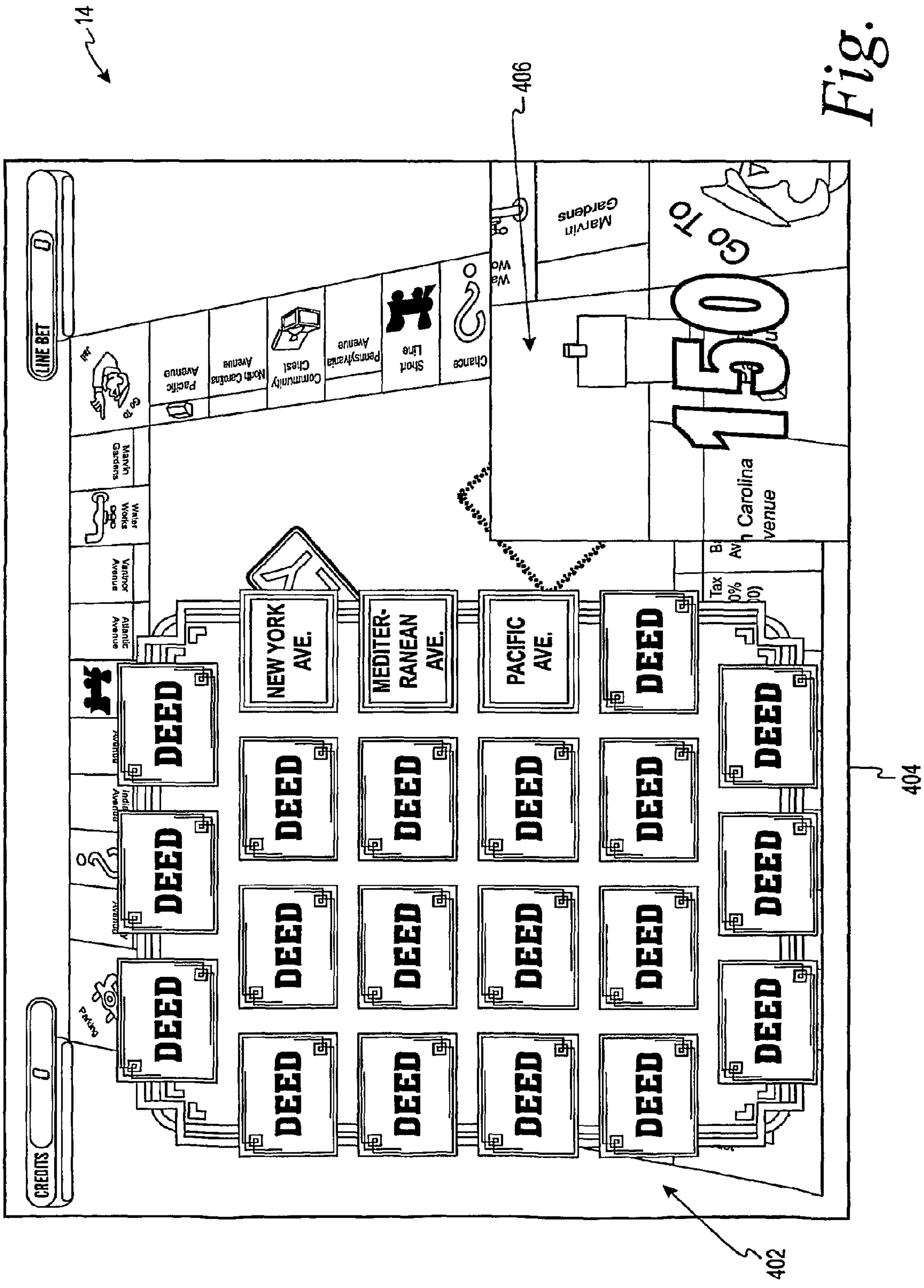
FIG. 8 is a display of a screen subsequent to the screen of FIG. 3 according to another embodiment of the present invention.

Furthermore, although in the embodiments of FIGS. 4-7, the second views 185, 206, 360, 385 and the third view 216 of the gaming elements are displayed in inset windows 186, 208*a,b*, 361, 383, the views may be displayed in other suitable ways. Referring to FIG. 8, for example, the display 14 includes a first view 402 displayed on a main screen 404. The display further includes a second view 406 positioned at the bottom right corner of the display 14 overlapping about one-quarter of the main screen 304. The views of the game elements may also be located in positions, or combinations of positions, other than those shown in the illustrated embodiments. In one non-limiting example, a display 14, 16 includes a split-screen wherein a first portion of the split-screen includes a first view and a second portion of the split-screen includes a second view. In another embodiment, a first view is displayed on a main screen, a second view is positioned over the first view in a corner of the display 14 (see FIG. 8), and a third view is shown in an inset window (see, e.g., FIG. 4).

According to another embodiment, a first view of the gaming environment is displayed on the primary display 14 and a second view is displayed on the secondary display 16. Other combinations of positions may also be used with the present invention. Furthermore, the screens and/or windows of the present invention may have shapes and sizes other than those of the illustrated embodiments.

Although in the illustrated embodiments, the 3-D real-time displays are shown during the bonus game, it is contemplated that the present invention may also be used during a basic game or both the basic game and a bonus game. Furthermore, although the basic game of the illustrated embodiment is a slot machine game, the present invention may also be used with other types of wagering games including, for example, video poker, video roulette, video keno, and the like. The various views of "elements", as described herein may include symbols, a location of a path, or the like that is used to indicate a randomly-selected outcome.

Each of these embodiments and obvious variations thereof is contemplated as falling within the spirit and scope of the claimed invention, which is set forth in the following claims.

What is claimed is:

1. A gaming system comprising:

an input device for receiving a wager to play a wagering game; and at least one display for displaying a plurality of game elements, the at least one display being adapted to display a first three-dimensional view of the plurality of game elements from a first viewpoint and a second three-dimensional view of at least one of the plurality of game elements indicating a randomly-selected outcome from a second viewpoint, the first three-dimensional view and the second three-dimensional view being rendered in real-time;

wherein the first three-dimensional view is generated using a first sequence of two-dimensional images captured by a first virtual camera and the second three-dimensional view is generated using a second sequence of two-dimensional images captured by a second virtual camera.

2. The gaming system of claim 1, wherein the first three-dimensional view is a broad view of a gaming environment and the second three-dimensional view is a close-up view of a portion of the gaming environment.

3. The gaming system of claim 1, further comprising at least one additional three-dimensional view of at least one of the plurality of game elements from at least one additional viewpoint.

4. The gaming system of claim 1, further comprising an inset window on the display adapted to display the second three-dimensional view therein.

5. The gaming system of claim 4, wherein the position of the inset window is adapted to move along the display according to a movement of the game element.

6. The gaming system of claim 5, wherein the game element is a token representing a player.

7. The gaming system of claim 1, wherein the first three-dimensional view is adapted to display a plurality of player-selectable elements and the second three-dimensional view is adapted to display an item associated with a selected one of the player-selectable elements.

8. A method of conducting a wagering game on a gaming system, the method comprising:

displaying a first three-dimensional view of a plurality of game elements from a first viewpoint;

displaying a second three-dimensional view of at least one of the plurality of game elements indicating a randomly selected outcome from a second viewpoint, the position of the at least one of the plurality of game elements being based on a randomly-selected outcome and generating the first three-dimensional view using a first sequence of two-dimensional images and generating the second three-dimensional view using a second sequence of two-dimensional images, wherein the first and second two-dimensional images being captured using at least one virtual camera, wherein the first three-dimensional view and the second three-dimensional view being simultaneously displayed in real-time.

9. The method of claim 8, wherein the first three-dimensional view is a broad view of a gaming environment and the second three-dimensional view is a close-up view of a portion of the gaming environment.

10. The method of claim 8, further comprising displaying at least one additional three-dimensional view of at least one of the plurality of game elements from at least one additional viewpoint.

11. The method of claim 8, wherein the second three-dimensional view is displayed in an inset window.

12. The method of claim 11, further comprising moving the inset window according to a movement of a game token.

13. The method of claim 12, wherein the game token represents a player's position.

14. The method of claim 8, wherein the first three-dimensional view is adapted to display a plurality of player-selectable elements and the second three-dimensional view is adapted to display a selected one of the player-selectable elements.

15. A non-transitory computer readable storage medium encoded with instructions for directing a gaming system to perform the method of claim 8.

16. A gaming system comprising:

an input device for receiving a wager to play a wagering game; and at least one display for displaying a path including a plurality of stations, the at least one display being adapted to display a first three-dimensional view of the path from a first viewpoint and a second three-dimensional view of a randomly-selected station from a second viewpoint, the first three-dimensional view and the second three-dimensional view being simultaneously rendered in real-time;

wherein the randomly-selected station further includes a symbol thereon.

17. The gaming system of claim 16, wherein the second three-dimensional view is displayed in an inset window.

* * * * *